United States Patent [19]

Takeuchi et al.

[11] Patent Number: 4,819,172
[45] Date of Patent: Apr. 4, 1989

[54] VEHICLE SPEED CONTROL SYSTEM

[75] Inventors: Hitoshi Takeuchi, Kariya; Masao Tsujii, Nagoya; Masahiro Ohba, Okazaki, all of Japan

[73] Assignee: Nippondenso Co., Ltd., Kariya, Japan

[21] Appl. No.: 917,593

[22] Filed: Oct. 9, 1986

[30] Foreign Application Priority Data

Oct. 9, 1985 [JP] Japan ................................ 60-226546

[51] Int. Cl.$^4$ ............................................. B60K 31/00
[52] U.S. Cl. ................................. 364/431.07; 180/170;
180/178; 180/179; 123/350; 324/161
[58] Field of Search ................... 364/431.07, 426, 160,
364/161, 162; 123/389, 401, 350; 324/160, 161;
180/170, 178, 179

[56] References Cited

U.S. PATENT DOCUMENTS

| 4,155,419 | 5/1979 | Mann | 180/176 |
| 4,190,026 | 2/1980 | Sakakibara | 180/179 |
| 4,406,261 | 9/1983 | Ikeura | 180/170 |

FOREIGN PATENT DOCUMENTS

| 0019915 | 2/1983 | Japan | 364/426 |
| 61-191435 | 8/1986 | Japan | |
| 62-857330 | 4/1987 | Japan | |
| 201424 | 8/1979 | United Kingdom | 123/389 |

OTHER PUBLICATIONS

"Optimal Speed Control of Automobile Using Microprocessor" by Shuta Murakami et al, published by Keisoku Jidou Seigyo Gakkai (Academy of Instrumentation Automatic Control), Aug., 1979.

"Vehicle Speed Control System Using Modern Control Theory" by T. Tabe et al; IECON'86, 1986 IEEE pp. 365-370.

"Cruise Control System (Auto-Drive)" by K. Tanigawa et al; FUJITSU vol. 30, No. 5 (1979); pp. 99-111.

Primary Examiner—Parshotam S. Lall
Assistant Examiner—Ellis B. Ramirez
Attorney, Agent, or Firm—Cushman, Darby & Cushman

[57] ABSTRACT

Disclosed is a vehicle speed control system for controlling the intake air amount introduced into an engine of a vehicle in order to allow the vehicle to travel at a target speed. The intake air amount is controlled in accordance with the integration value of deviation of the vehicle speed from the target speed. The integration value is rest when the vehicle acceleration is terminated and the reset integration value is derived on the basis of the vehicle speed and throttle valve opening degree. The vehicle speed control system includes an integral-added optimal regulator which determines the feedback amount on the basis of an optimal feedback gain predetermined in accordance with a dynamic model of the system relating to the constant travelling speed of the vehicle.

7 Claims, 3 Drawing Sheets

VEHICLE SPEED CONTROL SYSTEM

BACKGROUND OF THE INVENTION

The present invention relates generally to a speed control system for use in a motor vehicle, and more particularly to a speed control system which controls the intake air amount introduced into an engine of the motor vehicle in order to drive the motor vehicle at a target vehicle speed.

Generally, conventional speed control systems are based upon so-called proportion control in which an actuator is controlled in accordance with the results of comparison between a voltage with ripple representing an actual speed and a given voltage representing a target speed. However, in such a proportion control system, a steady-state deviation is necessarily present, thereby resulting in great speed variation. Therefore, in order to improve accuracy of control, it is generally known to incorporate an integration element into the control system. Such a speed control system for motor vehicles generally comprises an actuator for actuating a member provided for regulating the intake air amount introduced into an engine of the vehicle, a speed detector for detecting the speed of the vehicle, a deviation integrator for integrating the deviation of a vehicle speed obtained by the vehicle speed detector from a set target vehicle speed, and a drive signal generator for generating an actuator control signal on the basis of at least the integration value of the deviation obtained by the deviation integrator.

The deviation integrator continuously integrates the deviation of the detected vehicle speed from the target vehicle speed during the accelerating operation by a driver, and in response to the release from the accelerating operation the drive signal generator generates an actuator control signal corresponding to an integration value obtained at the time of the release, thereby regulating the intake air amount to be introduced into a vehicle engine. However, such the conventional speed control system suffers from taking a longer time for the vehicle speed to regain the target speed after the release from the accelerating operation and is subjected to a greater reduction of the vehicle speed during the regain interval.

In other words, when acceleration is performed with the vehicle driver depressing the accelerator pedal during speed control, the throttle valve is opened by the vehicle drive irrespective of a duty signal outputted from the control circuit to the actuator. During this, the deviation integrator continuously integrates the deviation. Therefore, there is a problem when, after stopping the acceleration by the vehicle driver, the duty signal whereby the actuator is controlled so as to drive the throttle valve to the closed direction is transiently outputted from the control circuit by the output of the deviation integrator accumulates abnormally, i.e., it is influenced by the integration value, irrespective of whether the actual vehicle speed goes below the target vehicle speed. After releasing from the constant-speed running state, it takes a long time until the actual speed follows the target speed, and undesired vehicle speed lowering can occur until the vehicle speed is coincident with the target speed.

SUMMARY OF THE INVENTION

It is therefore an object of the present invention to provide a vehicle speed control system which is capable of shortening the time which it takes for the vehicle speed to regain the target speed and to relax the vehicle speed reduction during the regain interval.

A vehicle speed control system according to the present invention comprises an actuator for actuating a throttle valve provided to regulate the amount of intake air introduced into an engine, a vehicle speed sensor for detecting an actual vehicle speed, and a control unit including deviation integrating means which integrates the deviation of the detected vehicle speed from the target vehicle speed and controlling the actuator in accordance with the deviation integration value so that the vehicle speed maintains a target vehicle speed.

In accordance with a feature of this invention, the control unit further includes integration value reset means for resetting the obtained deviation integration value to a value determined so that the vehicle speed approaches the target speed, in response to the termination of vehicle acceleration. The termination of vehicle acceleration is detected by comparing the present throttle value opening degree with the opening degree sensed at the time of the start of the acceleration. The reset integration value is derived as a function of the detected vehicle speed and the opening degree of the throttle valve. Preferably, the control unit is constructed as an integral-added optimal regulator which determines the feedback amount on the basis of an optimal feedback gain predetermined in accordance with a dynamic model of the system relating to the constant travelling speed of the vehicle.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
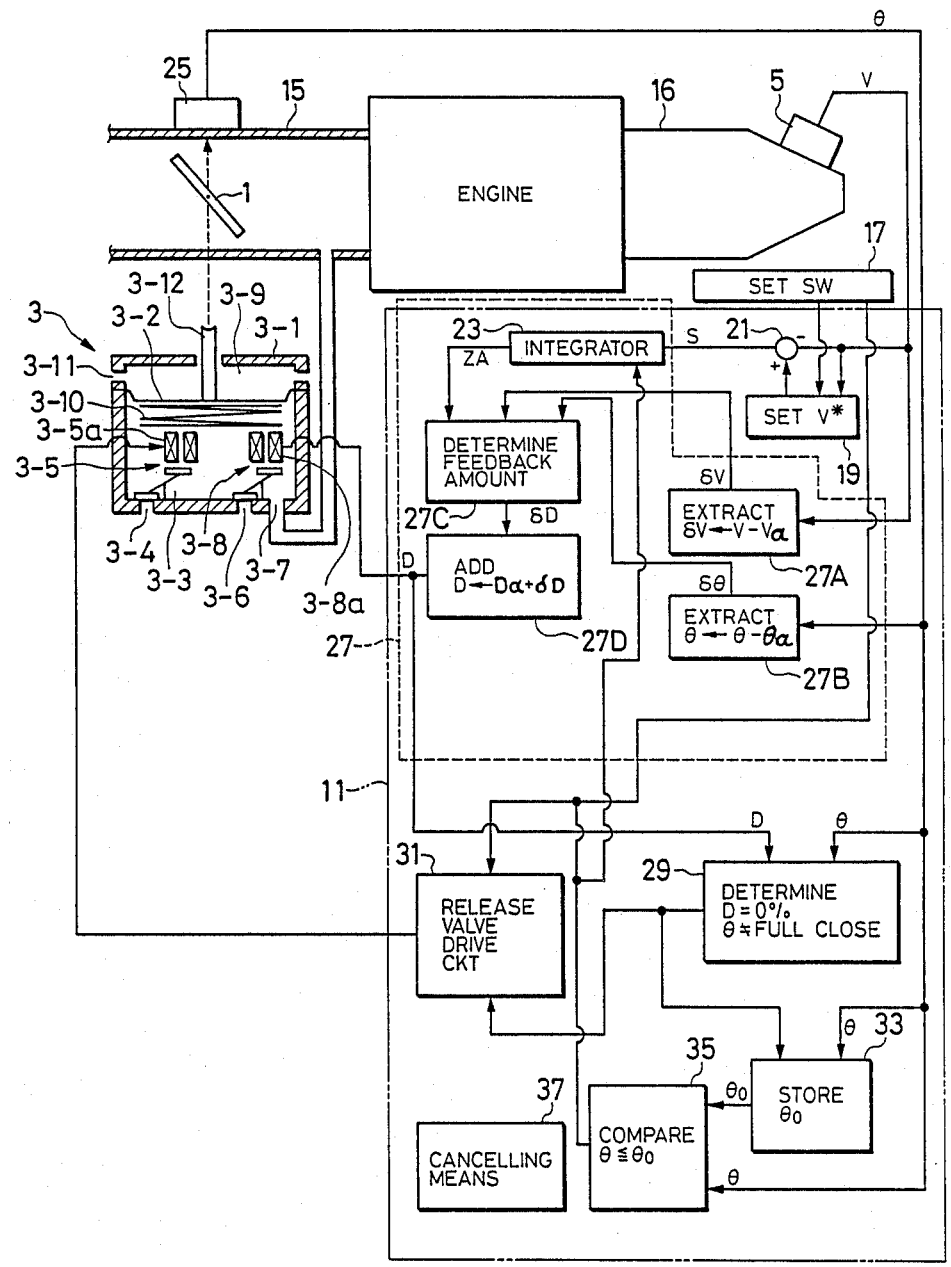
FIG. 1 is an illustration of a vehicle speed control system according to an embodiment of the present invention.

Referring now to FIG. 1, there is illustrated a vehicle speed control system according to the present invention. In the figure, an actuator 3 for actuating a throttle valve 1 is divided by a diaphragm 3-2 into two chambers 3-3 and 3-9. Provided in the lower chamber 3-3 are a release valve 3-5 for opening and closing a first opening 3-4 which communicates with the atmosphere and a control valve 3-8 for alternately opening and closing a second opening 3-6 which communicates with the atmosphere and a negative pressure introduction inlet 3-7 which communicates with an engine intake air passage 15. Also encased in the lower chamber 3—3 is a spring 3-10 for biasing the diaphragm 3-2 upwardly, i.e., in the direction of the other chamber 3-9. On the other hand, the upper chamber 3-9 has an optional number of third openings 3-11 which communicate with the atmosphere and are always opened. Housed in the upper chamber 3-9 is a rod 3-12 coupled to the diaphragm 3-2 so that it reciprocates in a straight direction in accordance with the displacement of the diaphragm 3-2. The other end of the rod 3-12 is coupled through an accelerating link (not shown) to the throttle valve 1 in the engine intake air passage 15 to control the opening degree of the throttle valve 1. As is known, the accelerating link is also coupled to the accelerator pedal operated by the vehicle driver, and the actuator 3 has its first opening 3-4 arranged so as to release the pressure in the diaphragm 3-2 to the atmosphere as soon as possible to close the throttle valve 1 after the vehicle drive stops the speed control.

During vehicle speed control, a drive coil 3-5a of the release valve 3-5 becomes energized by a signal from a control circuit 11, keeping the first opening 3-4 closed as illustrated in FIG. 1. On the other hand, during vehicle speed control, a pulse current with a duty ratio determined by the control circuit 11 passes through a drive coil 3-8a of the control valve 3-8. In response to the pulse current passing therethrough, the second opening 3-6 is set to the closed condition and the negative pressure introduction inlet 3-7 is set to the opened condition. When the pulse current does not pass therethrough, the second opening 3-6 is placed in the opened condition and the inlet 3-7 is placed in the closed condition.

A description will be made with respect to the control circuit 11 for controlling the actuator 3, and more specifically, for controlling the release valve 3-5 and the control valve 3-8.

The control circuit 11 receives a signal indicative of a throttle opening degree $\theta$ supplied from a known throttle position sensor 25, a signal indicative of an actual vehicle speed V fed from a known vehicle speed sensor 5, and a timing signal indicative of start command of the vehicle speed control supplied in response to the on-operation of a setting switch 17 which is performed by a vehicle driver, and control circuit 11 controls the duty D of a signal outputted to the actuator 3 and the turning-on-and-off of the release valve 3-5 in accordance with these signals. The throttle position sensor 25 has a potentiometer which is coupled to a shaft of the throttle valve 1 and which allows its electric resistance to be varied in accordance with the throttle valve opening degree. The vehicle speed sensor 5 is provided in the vicinity of a drive shaft of a transmission 16 and is arranged such that the speed of rotation of the drive shaft is detected by an electromagnetic pickup device. The setting switch 17 is provided at an appropriate position within the vehicle. The control circuit 11 comprises a microcomputer including a central processing unit (CPU), a read-only memory (ROM), a random access memory (RAM), and other associated units.

The control circuit 11 has function blocks as illustrated in FIG. 1.

Designated at numeral 27 and indicated by a dotted line is an integral-added optimal regulator which determines the amount of feedback so that the actual vehicle speed V is coincident with a target vehicle speed V*, on the basis of an optimal feedback gain predetermined in accordance with the dynamic model of the system relating to the constant travelling speed. Here, the dynamic model of the system means the dynamic characteristics of the object to be controlled which is expressed mathematically, and the optimal feedback gain means the gain obtained on the basis of use of the optimal regulator so that the performance is at least of a minimum, thereby ensuring stability. In modern control using such an integral-added optimal regulator, the standard operating point in the linear region of the model which is an operating point, i.e., one point with static characteristics in the linear region, is predetermined and an optimal feedback amount is determined on the basis of a perturbation component from the standard operating point. The dynamic model is expressed as a movement of the perturbation component from this operating point. The linear model generally used in control theory is a perturbation model which represents the dynamic characteristic relating to the variation amount from one point of the static characteristic. Accordingly, in the case of the model of a vehicle to be controlled, the perturbation component $\delta D$ of duty D is obtained from an integration value ZA of the deviation of an actual vehicle speed V from a target vehicle speed V*, the perturbation component $\delta V$ between the actual vehicle speed V and the vehicle speed Va in the standard operating point, and the perturbation component $\delta\theta$ between the throttle opening degree $\theta$ and the throttle opening degree $\theta a$ in the standard point.

The following is a description in terms of obtaining the integration value ZA.

A timing signal outputted from the setting switch 17 is supplied to a target vehicle speed setting means 19 and a release valve drive circuit 31. The setting switch 17 is operated similarly to that of a well known speed control apparatus. That is, when the setting switch 17 is depressed with a desired speed being obtained in response to the vehicle driver depressing the accelerator pedal, the vehicle speed at the time of the depression is stored as the target vehicle speed V*. The target vehicle speed setting means 19 is arranged to set the target vehicle speed V* in accordance with an actual vehicle speed V obtained at the time the timing signal is outputted, that is, the actual vehicle speed V obtained at the time of generation of the timing signal is determined as the target vehicle speed V*. A subtraction means 21 is provided to obtain the deviation S of the actual vehicle speed V from the target vehicle speed V*. The obtained deviation S is integrated by an integrator 23, thereby obtaining the integration value ZA.

The perturbation component $\delta V$ of vehicle speed and the perturbation component $\delta\theta$ are respectively obtained by perturbation component extracting sections 27A and 27B of the integral-added optimal regulator 27. The feedback amount determining section 27C of the optimal regulator 27 calculates the perturbation component $\delta D$ in accordance with the following equation upon receipt of ZA, $\delta V$, $\delta\theta$.

$$\delta D(n) = K1 \cdot ZA(n) - K2 \cdot \delta\theta - K3 \cdot \delta V \quad (1)$$

where K1, K2, and K3 are optimal feedback gains obtained in accordance with the dynamic model. Accordingly, when the deviation integration value ZA(n) becomes greater, the perturbation component $\delta D$ is determined to make the integration value ZA(n) small.

In a standard value adding section 27D of the optimal regulator 27, a duty Da in the standard operating point is added to the perturbation component $\delta D$ thus obtained, and therefore the duty D of a signal outputted to the control valve 3-8 is expressed by the following equation.

$$D = Da + \delta D \quad (2)$$

In the case that control is performed in the standard operating point, when the duty is Da, the throttle opening degree is $\theta a$ and the vehicle speed becomes Va. Da, Va, and $\theta a$ are respectively stored in advance in the ROM of the microcomputer. These features of the present invention will be described in more detail below.

The integrator 23 is reset in response to a reset command signal from an accelerating-operation termination decision means 35, which will be described hereinafter, to reset the deviation integration value ZA. In this case, the reset value of the integration value ZA is determined so that the duty D becomes equal to the duty Da in the standard operating point, that is, $\delta D=0$. Therefore, the value of ZA at the time of reset is obtained from the following equation which is a variation of the equation (1).

$$ZA = \frac{K2 \cdot \delta\theta + K3 \cdot \delta V}{K1} \qquad (3)$$

The release valve drive circuit 31 energizes the drive coil 3-5a of the release valve 3-5 in response to a speed control command signal, i.e., the timing signal outputted from the setting switch 17, and then interrupts the energization of the drive coil 3-5a upon receipt of a signal indicative of the starting of the accelerating operation fed from a starting decision means 29 which will be described hereinafter, before again starting the energization of the drive coil 3-5a upon receipt of a signal from the accelerating-operation terminating decision means 35.

Further included in the control circuit 11 are accelerating-operation start decision means 29 for determining the start of the vehicle accelerating operation by a vehicle driver and accelerating-operation termination decision means 35 for determining the termination of the accelerating operation. The start decision means 29 determines the start of the accelerating operation under the conditions that the duty D is 0% and the throttle valve 1 is not closed fully, and the termination decision means 35 compares the throttle valve opening degree $\theta$o stored in the throttle opening degree storage means 33 with the throttle opening degree $\theta$ detected by the throttle position sensor 25. The throttle opening degree storage means 33 stores a throttle opening degree $\theta$o which is detected upon receipt of the signal from the accelerating-operation start decision means 29. If $\theta < \theta$o, the termination decision means 35 supplies an ON command signal to the release valve drive circuit 31 to perform the energization of the drive coil 3-5a of the release valve 3-5 and further supplies a reset command signal to the integrator 23 to reset the deviation integration value.

The control circuit 11 has a function for cancelling the vehicle speed control, and the cancelling is performed by a control cancelling means 37. This control cancelling means 37 has an arrangement similar to that of a conventional speed control apparatus. For example, in response to depression of the braking pedal during constant-speed running, the control is cancelled to interrupt all of the calculations, and the release valve 3-5 and the control valve 3-8 are deenergized so that the pressure in the diaphragm 3-2 is released to the atmosphere.

Figure 2:
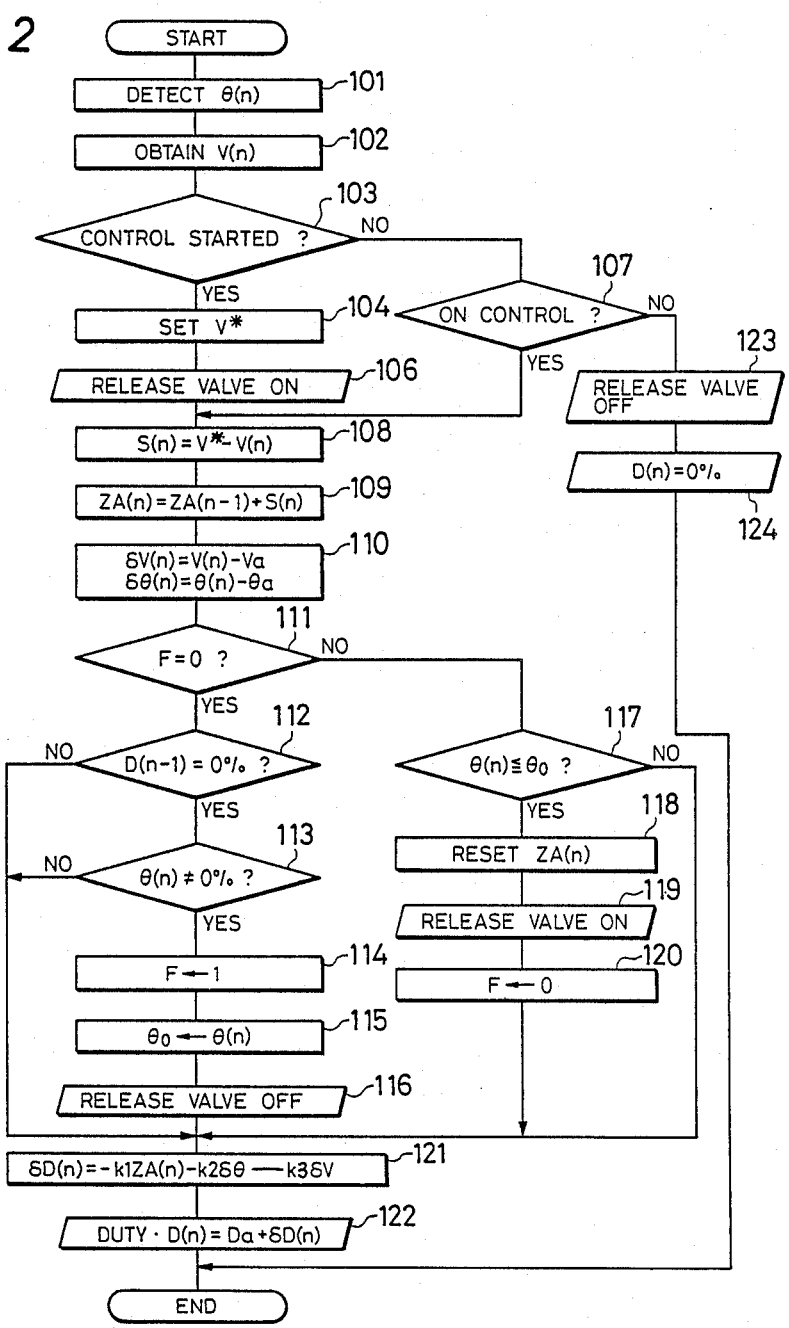
FIG. 2 is a flow chart illustrating the detailed processes performed by the control circuit 11.

The processes performed by the control circuit 11 will be hereinbelow described in detail with reference to FIG. 2.

A throttle valve opening degree $\theta(n)$ is detected in accordance with the output signal of the throttle position sensor 25 (step 101), and the present vehicle speed V(n) is calculated on the basis of the output signal of the vehicle speed sensor 5 (step 102). A decision is made with respect to whether speed control is being started, that is, whether the setting switch 17 is turned on (step 103). If the decision is "YES", indicating the start of the speed control, the present vehicle speed V(n) obtained in the step 102 is set as a target vehicle speed V* (step 104). Also energized is the release valve 3-5 (step 106). If the decision is "NO", a step 107 follows to check whether the vehicle is on the vehicle speed control. When the decision is negative, that is, when a speed control cancelling signal is supplied from the speed control cancelling means 37, the step 107 is followed by steps 123 and 124 in which the release valve 3-5 is de-energized and the duty D(n) is set to 0%. After the execution of the steps 123 and 124, this routine is terminated. The speed control cancelling means 37 generates the cancelling signal when the brake pedal is pressed or when the vehicle speed is decreased below a predetermined value. In step 107, when the decision is affirmative, on the other hand, control goes to a step 108 and the following processes are executed.

The deviation S(n) of the present vehicle speed V(n) from the target vehicle speed V* is obtained (step 108), and the integration value ZA(n) of the deviation S(n) is obtained in accordance with $ZA(n)=ZA(n-1)+S(n)$ (step 109). The difference between the present vehicle speed V(n) and a basic speed Va, i.e., perturbation component $\delta V(n)$, and the difference between the present throttle opening degree $\theta(n)$ and the basic opening degree $\theta$a, i.e., perturbation component $\delta\theta(n)$, are respectively obtained (step 110). A flag F is set to "0" (step 111) and a decision is then made with respect to whether accelerating operation is started by a vehicle driver (steps 112 and 113). If started, after a flag F is set to "1" (step 114), the throttle opening degree $\theta(n)$ obtained at the time of the start is set as a accelerating-operation termination decision reference value $\theta$o and the release valve 3-5 is turned off (steps 115 and 116). Here, the decision with respect to the accelerating-operation start is made under the conditions, for example, that a previous duty cycle D(n-1) is 0% and the throttle opening degree $\theta(n)$ is not 0%, that is, the throttle valve 1 is not perfectly closed.

After the accelerating operation start is determined, a decision is made with respect to whether the accelerating operation is terminated (step 117). If terminated, the deviation integration value ZA(n) is reset and the release valve 3-5 is turned on (steps 118 and 119). The flag F is also reset to "0" (step 120). Here, the decision with respect to termination of the accelerating operation is made under the condition that the throttle opening degree $\theta(n)$ is smaller than the decision reference $\theta$o. The deviation integration reset value can be obtained in accordance with the above-mentioned equation (3).

The perturbation component $\delta D(n)$ with respect to the basic duty Da of a control valve drive signal to be outputted is obtained in accordance with the above-mentioned equation (1) (step 121). Also, the duty D(n) of a control valve drive signal to be outputted is obtained in accordance with $D(n)=Da+\delta D(n)$ (equation 2), and the control valve drive signal with the duty D(n) is then outputted (step 122).

Figure 3:
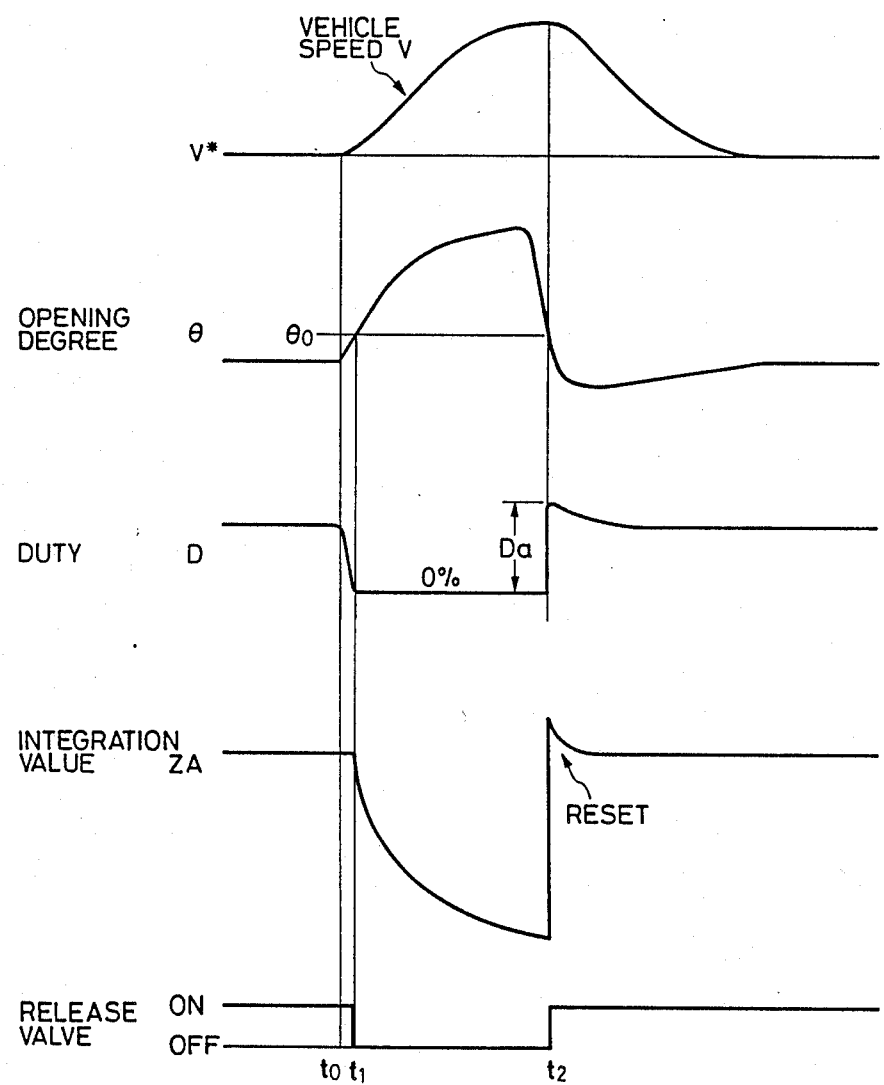
FIG. 3 is a graphic illustration useful for understanding the present invention.

FIG. 3 is a timing chart useful for understanding the present invention.

When a driver operates an accelerator pedal of the vehicle at a time to, the opening degree of the throttle valve 1 becomes greater and thus the actual vehicle speed V(n) is gradually increased with respect to a target vehicle speed V*. The deviation S is obtained by $V^* - V(n)$, and therefore, with the actual vehicle speed V being increased, the value of the deviation S becomes negative and the deviation integration value ZA(n) also becomes negative. As the vehicle speed increases, the deviation integration value is varied as illustrated. On the other hand, as is obvious from the above-mention equation (1), when the vehicle speed V(n) and the throttle opening degree $\theta$ are respectively increased and the deviation integration value ZA(n) is increased in the negative direction, the perturbation component $\delta D$ becomes negative and its absolute value is increased. Therefore the duty D rapidly approaches 0% and finally becomes 0% at a time t1. At this time, since the throttle opening degree is not zero, the determination of acceleration start is made in the steps 112 and 113 of FIG. 2 and, as a result, the throttle opening degree $\theta o$ is stored in the throttle opening degree storage means 33 (step 115) and the release valve 3-5 is deenergized. Thereafter, in response to the release of the accelerating pedal, the throttle opening degree $\theta$ is decreased, and when the opening degree $\theta$ becomes smaller than the stored opening degree $\theta o$ (time t2), the deviation integration value ZA is reset to the value obtained in accordance with the above-mentioned equation (3). Therefore, the perturbation component $\delta D$ of the duty D becomes zero.

Namely, since the deviation integration value ZA is reset to an appropriate value in response to the accelerating-operation termination decision, the actual vehicle speed V quickly varies toward the target vehicle value $V^*$ without becoming smaller than the target vehicle speed $V^*$ as illustrated.

It is should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. A system for controlling the speed of a motor vehicle, comprising:

actuator means for actuating a member provided for regulating the amount of intake air introduced into an engine of said vehicle;

speed sensor means for detecting a speed of said vehicle and for generating a signal indicative of the detected vehicle speed;

position sensor means for detecting a regulating position of said intake air regulating member;

target speed setting means for setting a target vehicle speed;

subtraction means for successively obtaining a deviation of the vehicle speed detected by said speed sensor means from the set target vehicle speed;

integrator means for integrating the successively obtained deviation;

control means for generating a drive signal to said actuator means on the basis of said obtained deviation integration value so that the detected vehicle speed becomes equal to said target vehicle speed;

accelerating termination detecting means for detecting a termination of acceleration of said vehicle which is independent of the actuating of said actuator means by a driver of said vehicle and for generating an integration value reset command signal; and reset means for changing the deviation integration value obtained by said integrator means so as to become smaller in absolute value in response to the generated reset command signal.

2. A system as claimed in claim 1, wherein said integrator means and said reset means are constructed as an integrated-added optimal regulator which controls vehicle speed on the basis of an optimal feedback gain predetermined in accordance with dynamic model of the vehicle.

3. A system as claimed in claim 1, further comprising vehicle acceleration detecting means for detecting the start of acceleration of said vehicle which is independent of the actuating of said actuator means by said driver and storage means for storing an opening degree of said intake air regulating member detected at the time the start of acceleration is detected, and wherein said termination detecting means is adapted to detect the termination of acceleration when the detected opening degree is smaller than the opening degree stored in said storing means.

4. A system as claimed in claim 3, wherein said vehicle acceleration detecting means detects the start of acceleration on the basis of the detected regulating position of said intake air regulating member and the drive signal supplied from said control means to said actuator means.

5. A system as claimed in claim 1, further comprising speed control cancelling means for cancelling the vehicle speed control when a brake pedal of said vehicle is pressed or when the detected vehicle speed becomes below a predetermined value.

6. A system as claimed in claim 5, wherein said drive signal supplied from said control means to said actuator means is a duty signal, and the duty is determined by adding a basic duty at said predetermined standard operating point to the duty obtained by said feedback amount determining means.

7. A system as claimed in claim 1, wherein said reset means comprises a feedback amount determining means for determining a duty ratio to change the control state of said actuator means by multiplying optimal feedback gains predetermined on the basis of a dynamic model of said actuator means and said control means by at least said deviation integration value obtained by said integrator means, a deviation between the vehicle speed detected by said speed sensor means and a basic speed of said vehicle at a predetermined standard operating point of said actuator means, and a deviation between a value representing a regulating position of said intake air regulating member detected by said position sensor means and a value representing a basic regulating position of said intake air regulating member at said predetermined standard operating point.

* * * * *